United States Patent [19]
Atwood et al.

[11] Patent Number: 5,519,487
[45] Date of Patent: May 21, 1996

[54] METHOD FOR MONITORING THE POSITION OF A FIBER

[75] Inventors: Thomas J. Atwood, Everett, Mass.;
David A. Pastel, Horseheads, N.Y.;
Bruce W. Reding, Wilmington, N.C.

[73] Assignee: Corning Incorporated, Corning, N.Y.

[21] Appl. No.: 368,311

[22] Filed: Dec. 30, 1994

[51] Int. Cl.$^6$ .............................. G01B 9/02; G01B 11/14
[52] U.S. Cl. .......................................... 356/73.1; 356/356
[58] Field of Search .................................... 356/73.1, 356

[56] References Cited

U.S. PATENT DOCUMENTS

| | | | |
|---|---|---|---|
| 3,982,816 | 9/1976 | Watkins | 356/73.1 |
| 4,067,651 | 1/1978 | Watkins | 356/73.1 |
| 4,280,827 | 7/1981 | Murphy et al. | 356/73.1 X |
| 5,185,636 | 2/1993 | Button et al. | 356/73.1 |
| 5,283,628 | 2/1994 | Dotson et al. | 356/355 |
| 5,309,221 | 5/1994 | Fischer et al. | 356/355 |
| 5,408,308 | 4/1995 | Allegretto et al. | 356/73.1 |

OTHER PUBLICATIONS

"Measurement of Optical Fiber Diameter Using the Fast Fourier Transform", *Applied Optics*, vol. 19, pp. 2031–2033 (1980).*

*Primary Examiner*—Vincent P. McGraw
*Attorney, Agent, or Firm*—Maurice M. Klee

[57] ABSTRACT

A system for monitoring the position of a fiber (13) during drawing is provided. The system includes a beam (25) of radiation which is directed at the fiber (13), a Ronchi ruling (50) having a spatial frequency $\omega_M$ which modulates light scattered from the fiber (13), a lens system (27) having a positive focal length, and a detector (31) located in the back focal plane of the lens system. By arranging the components of the system in this manner, the distance between the fiber (13) and the Ronchi ruling (50) is a linear function of the spatial frequency $\omega_D$ of the modulated light at the detector (29). Various procedures can be used to determine $\omega_D$, a preferred one being shown in FIG. 9.

25 Claims, 9 Drawing Sheets

5,519,487

1

METHOD FOR MONITORING THE POSITION OF A FIBER

FIELD OF THE INVENTION

This invention relates to methods and apparatus for monitoring the position of an optical waveguide fiber or other transparent filament. More generally, the invention relates to methods and apparatus for measuring the distance to an object or to a portion of the surface of an object.

BACKGROUND OF THE INVENTION

U.S. Pat. Nos. 5,185,636, 5,283,628, and 5,309,221, assigned to the assignee of this application, describe techniques for monitoring various properties of an optical waveguide fiber during the drawing of the fiber from a preform.

In particular, U.S. Pat. No. 5,309,221 is directed to measuring the diameter of a fiber with high precision, U.S. Pat. No. 5,283,628 deals with measuring the diameter of a non-circular fiber and provides a method for characterizing the extent to which a fiber is noncircular, and U.S. Pat. No. 5,185,636 describes techniques for detecting defects in fibers.

In their preferred embodiments, each of these patents employs the fiber monitoring system shown schematically in FIGS. 1 and 2. FIG. 1 shows the basic elements of an interference-based system for measuring fiber diameters as originally disclosed in U.S. Pat. Nos. 3,982,816 and 4,067,651 to Lawrence Watkins. See also Murphy et al., U.S. Pat. No. 4,280,827.

As shown in this figure, an optical waveguide fiber 13, whose cross-section has been greatly expanded for purposes of illustration, is transversely illuminated by light 25 of sufficient spatial coherence and monochromaticity to create a discernible interference pattern in the far field. The interference pattern arises from the superposition of light reflected from the fiber surface 17 and light refracted through the fiber body 13. In practice, as shown in FIG. 2, a laser 23, e.g., a helium-neon (HeNe) laser, is the preferred light source because of its wavelength stability. The following discussion is thus in terms of a laser light source, it being understood that other light sources having sufficient spatial coherence and monochromaticity can be used if desired.

As explained in the above-referenced Watkins patents, in the far field, the light reflected and refracted from fiber 13 interferes to form fringe pattern 19. For an optical waveguide fiber having a core and a cladding, the fringe pattern will in general be a function of the wavelength of the incident light and of the indices of refraction and the diameters of both the core and the cladding. However, as shown by Watkins, if the core/clad ratio is not too large and if the fringe pattern is examined at sufficiently large angles, above about ±50° in FIG. 1 for core/clad ratios of less than about 0.5, the pattern will depend almost exclusively on the diameter and index of refraction of the cladding.

Accordingly, if the index of refraction of the cladding is known, the outside diameter (O.D.) of the fiber can be determined by analyzing the fringe pattern. For example, the diameter can be estimated with relatively good precision by counting the number of full and partial fringes between two angles and then converting that number to a fiber diameter value using the equations of the Watkins patents or an empirical calibration.

2

Rather than counting fringes, fiber diameters can also be determined by generating a spatial frequency spectrum for the interference pattern and detecting a component of that spectrum which corresponds to the outside diameter of the fiber (the "outside diameter" or "O.D." component). Like the number of fringes between two angles, the frequency of the O.D. component is directly related to the diameter of the fiber.

The use of spatial frequency spectra to measure fiber diameters is discussed in an article by Mustafa A. G. Abushagur and Nicholas George entitled "Measurement of optical fiber diameter using the fast Fourier transform," *Applied Optics*, Vol. 19, pages 2031–2033 (1980). In particular, this article discusses the use of fast Fourier transforms (FFTs) to generate the frequency spectrum from which the O.D. component is detected.

U.S. Pat. No. 5,309,221, referred to above, describes improved methods for determining the frequency of the O.D. component. The methods for identifying the O.D. component disclosed in that patent are the preferred methods for practicing certain embodiments of the present invention (see below).

U.S. Pat. No. 5,283,628, also referred to above, extends the Watkins approach to non-circular fibers. Preferred equipment for doing so is shown in FIG. 2 where optical systems 26,27 project the far-field interference pattern 19 of FIG. 1 onto left and right detectors 29,31. The detectors can comprise linear arrays of photodetectors whose output, after analog to digital conversion, consists of a digital representation of the fringe pattern. A discussion of optical systems 26,27 and their relationship to detectors 29,31 can be found in the above referenced U.S. Pat. No. 5,309,221.

As shown in FIG. 2, the center of detector 29 lies at +61.5° and the center of detector 31 lies at −61.5°. The derivation of these values is discussed in detail in the above referenced U.S. Pat. No. 5,283,628. A preferred angular extent for each detector is 16°, i.e., from +53.5° to +69.5° for detector 29 and from −53.5° to −69.5° for detector 31. Detectors having other angular extents can, of course, be used if desired.

In accordance with U.S. Pat. No. 5,283,628, the output of each detector is analyzed separately to generate a signal representative of the diameter of the fiber, and the two signals are averaged to produce a final signal which is representative of the fiber diameter and which is substantially insensitive to fiber ellipticity.

U.S. Pat. No. 5,185,636, referred to above, further extends the Watkins approach to the detection of defects in fibers. FIG. 3 hereof is a copy of FIG. 7(b) of U.S. Pat. No. 5,185,636, and constitutes a spatial frequency spectrum for a computed far-field interference pattern of a 125 micron, coreless fiber containing a 5 micron on-center hole for the angular range between 50 and 70 degrees in FIG. 1 hereof. The O.D. component for this fiber occurs at a spatial frequency of about 3.1 fringes/degree. The second peak in this spectrum, i.e., the one occurring at about 1.7 fringes/degree, is produced by the 5 micron hole (defect). As explained in U.S. Pat. No. 5,185,636, by searching for such second peaks, the presence of defects in a fiber can be readily determined.

For ease of reference, a second peak of the type shown in FIG. 3 will be referred to herein as a "defect component" of a fiber's spatial frequency pattern. It should be noted that there is a third peak in FIG. 3 at around zero fringes/degree. This peak will be referred to herein as the "DC component".

EPO Patent Publication No. 608,538, also assigned to the assignee of the present invention, discloses a further use for the spatial frequency spectrum of a fiber. The problem which this patent publication addresses is that of monitoring the thickness of hermetic coatings, e.g., carbon coatings, which are applied to fibers during the drawing process to reduce, among other things, water corrosion. As explained therein, the magnitude of the O.D. component is inversely related to the thickness of the hermetic coating and thus this magnitude (and preferably this magnitude normalized by the magnitude of the D.C. component) can be effectively used to monitor and control the application of such coatings. When a spatial frequency spectrum is used for this purpose, the laser light applied to the fiber to generate the Watkins interference pattern is preferably polarized so that the beam's electric field component is substantially parallel to the longitudinal axis of the fiber (referred to hereinafter as "polarized illumination").

The foregoing, commonly assigned, U.S. Pat. Nos. 5,185,636, 5,283,628, and 5,309,221 and EPO Patent Publication No. 608,538 are hereby incorporated herein by reference.

PROBLEMS ADDRESSED BY THE INVENTION

The present invention provides a further capability to fiber monitoring systems of the type described above, namely, the ability to monitor and thus control the position of the fiber as it is being drawn. Such positional information is needed to keep the fiber centered and to monitor tension in the fiber through the measurement of the temporal frequency of standing waves along the length of the fiber.

Current fiber position monitors involve imaging the fiber onto a detector and/or detecting the edge of the fiber. Since there is limited space available for fiber monitoring on a draw tower, the use of a separate position monitor in addition to a diameter-defect-coating monitor of the type described above is undesirable.

Also, existing position monitors cannot detect very small oscillations and consequently, fiber tension information can be lost when the standing waves on the fiber become very small. In addition, current monitors which image the fiber onto a detector are sensitive to front-to-back motions of the fiber which result in the fiber going out of focus at the detector. Specifically, the ability to monitor side-to-side motion at the detector degrades as the fiber moves forward or backward from its in-focus position. This loss of precision with loss of focus further limits the usefulness of current monitors in determining fiber tension.

SUMMARY OF THE INVENTION

In view of the foregoing, it is an object of the present invention to provide improved methods and apparatus for monitoring (measuring) the distance to an object, such as an optical waveguide fiber. Further, it is a particular object of the invention to provide a position monitor which can be combined with a diameter-defect-coating monitor of the type described above with a minimum addition of hardware.

To achieve these and other objects, the invention in accordance with certain of its aspects provides a system for determining the distance to a surface comprising:

- detecting means (29, 31, 131) for detecting light (68, 69) at a plurality of spatially distributed locations ($L_1, L_2$);
- illuminating means (23, 123) for directing a beam (25, 125) of light at the surface (17, 113) so that at least a portion of the beam is scattered, e.g., diffusely reflected, from the surface (17, 113) onto the detecting means (the scattered light);
- spatial modulating means (50, 150) between the surface (17, 113) and the detecting means (29, 31, 131) for spatially modulating the scattered light, said spatial modulation of the scattered light having a spatial frequency $\omega_M$;
- means (201, 202, 203, 204, 205, 206) for determining a spatial frequency $\omega_D$ of the spatially modulated scattered light at the detecting means (29, 31, 131), the distance between the spatial modulating means (50, 150) and the surface (17, 113) being a function of $\omega_D$.

The means for determining the spatial frequency $\omega_D$ of the spatially modulated scattered light at the detecting means can take various forms. For example, this means can perform fringe counting based on peaks, valleys, and/or zero crossings, with the fringe counting being performed directly on the spatial data produced by the detecting means or on spatial data that has been numerically smoothed or filtered. For fringe counting, the spatial frequency $\omega_D$ is the number of fringes counted divided by the characteristic dimension of the detecting means, e.g., the length of the detecting means. In the preferred embodiments of the invention, the spatial frequency $\omega_D$ is determined in the spatial frequency domain by performing a transform, preferably a Fourier transform, of the spatial data produced by the detecting means. Other spatial frequency domain approaches can also be used, if desired, such as a wavelet approach.

In certain preferred embodiments of the invention, the system includes a lens system (26, 27, 127) between the surface (17, 113) and the spatial modulating means (50, 150), which has a positive optical power. By placing the detecting means (29, 31, 131) in the lens system's back focal plane, the distance between the spatial modulating means (50, 150) and the surface (17, 113) becomes a linear function of $\omega_D$.

In other preferred embodiments of the invention, the distance measured is that to an optical waveguide fiber and the measurement is used as part of a control system for controlling the drawing of the fiber from a preform. The control system preferably also controls fiber diameter and hermetic coating thickness, and monitors the fiber for defects.

Figure 7:
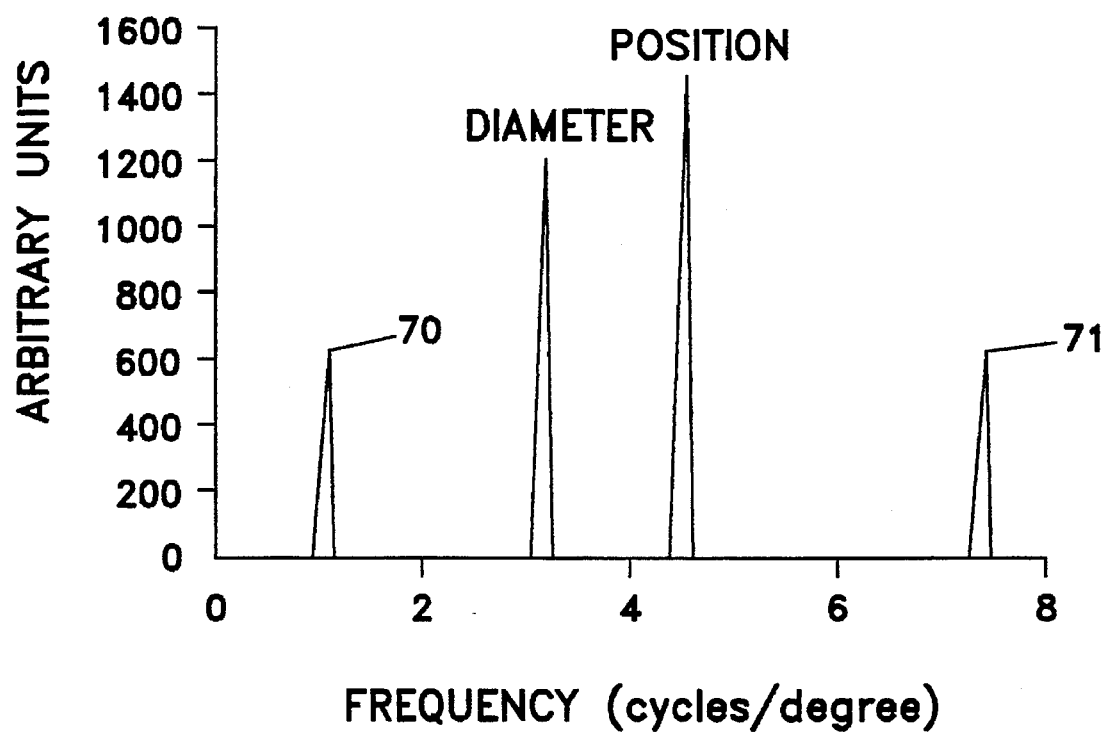
FIGS. 7 and 8 are stylized drawings of spatial frequency spectra for a defect-free optical waveguide fiber whose position and diameter are monitored using the apparatus of FIG. 4. The position of the fiber is the same in both Figures.
Figure 8:
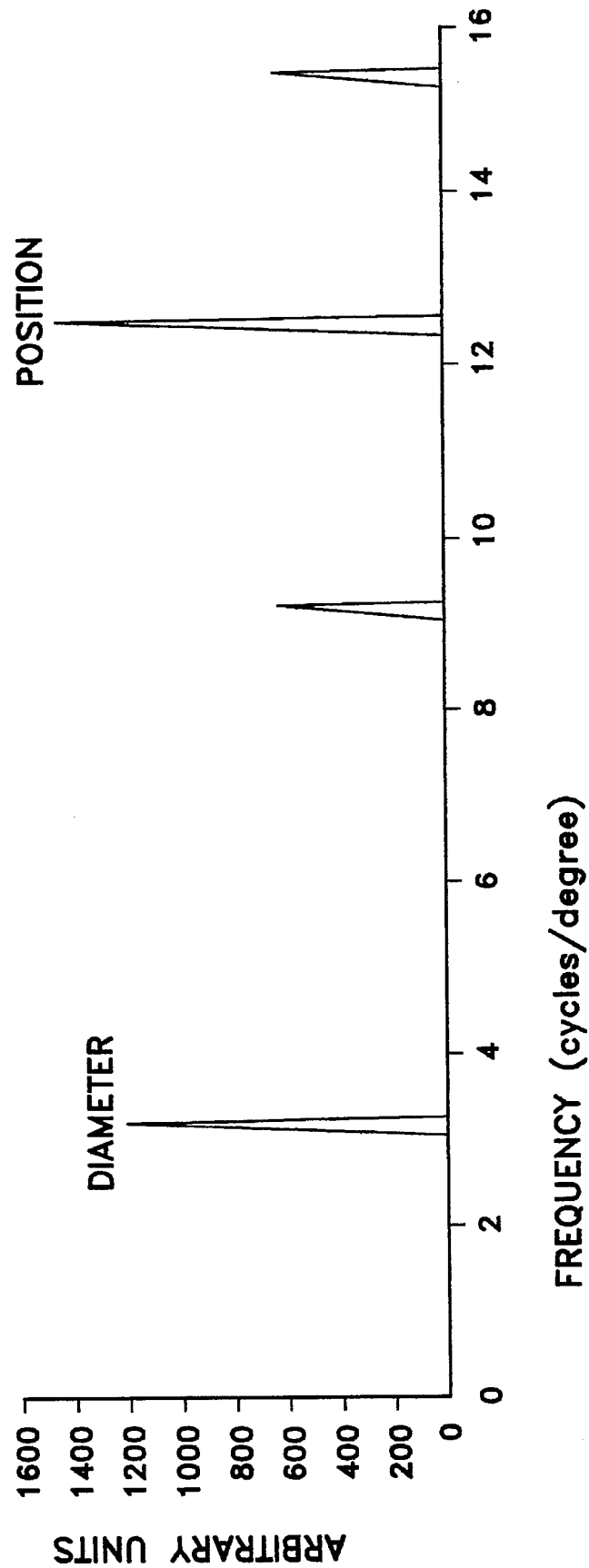

$\omega_M$ is about 4.0 cycles/mm in FIG. 7 and about 12.3 cycles/mm in FIG. 8.

Figure 9:
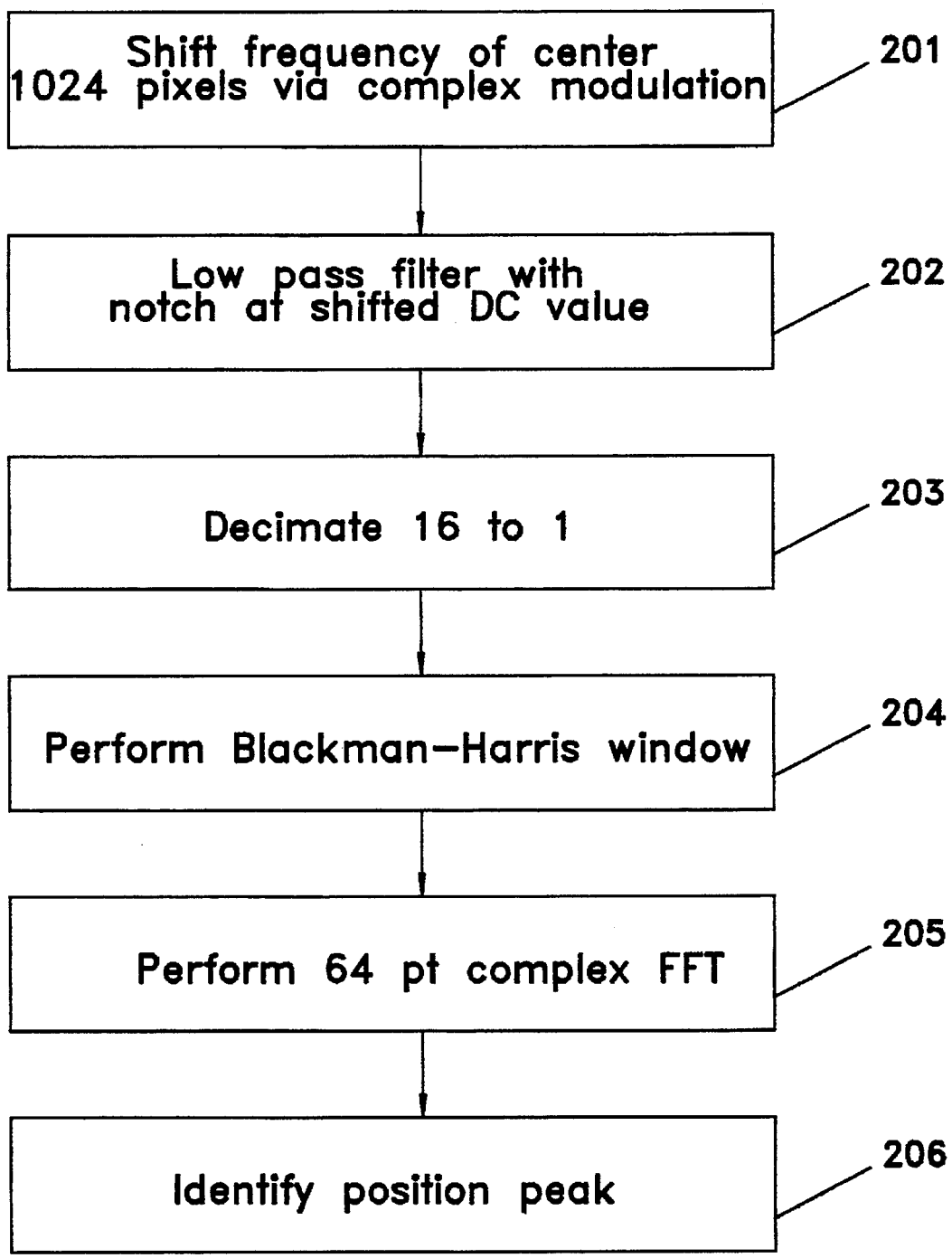

FIG. 9 is a block diagram showing a preferred procedure for generating a spatial frequency spectrum for use in the practice of the present invention.

Figure 10:
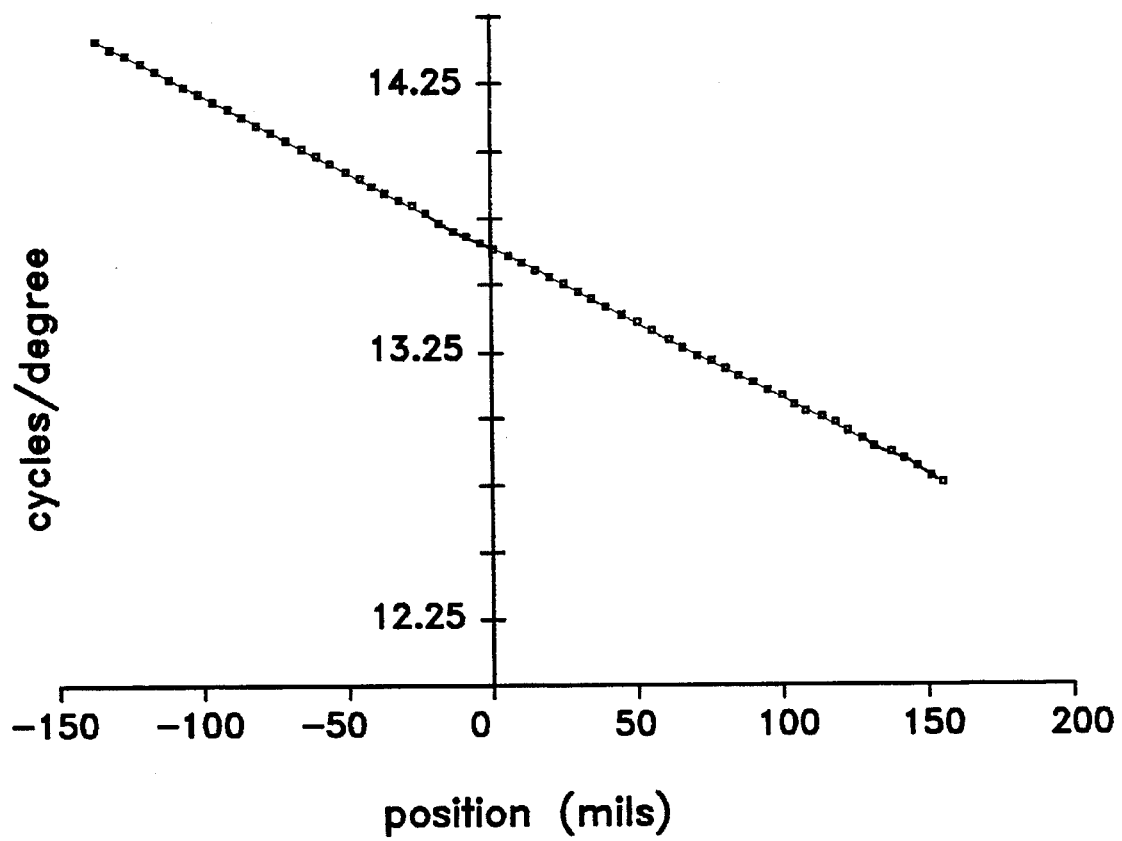

FIG. 10 illustrates the linearity of a preferred embodiment of the present invention.

Figure 11:
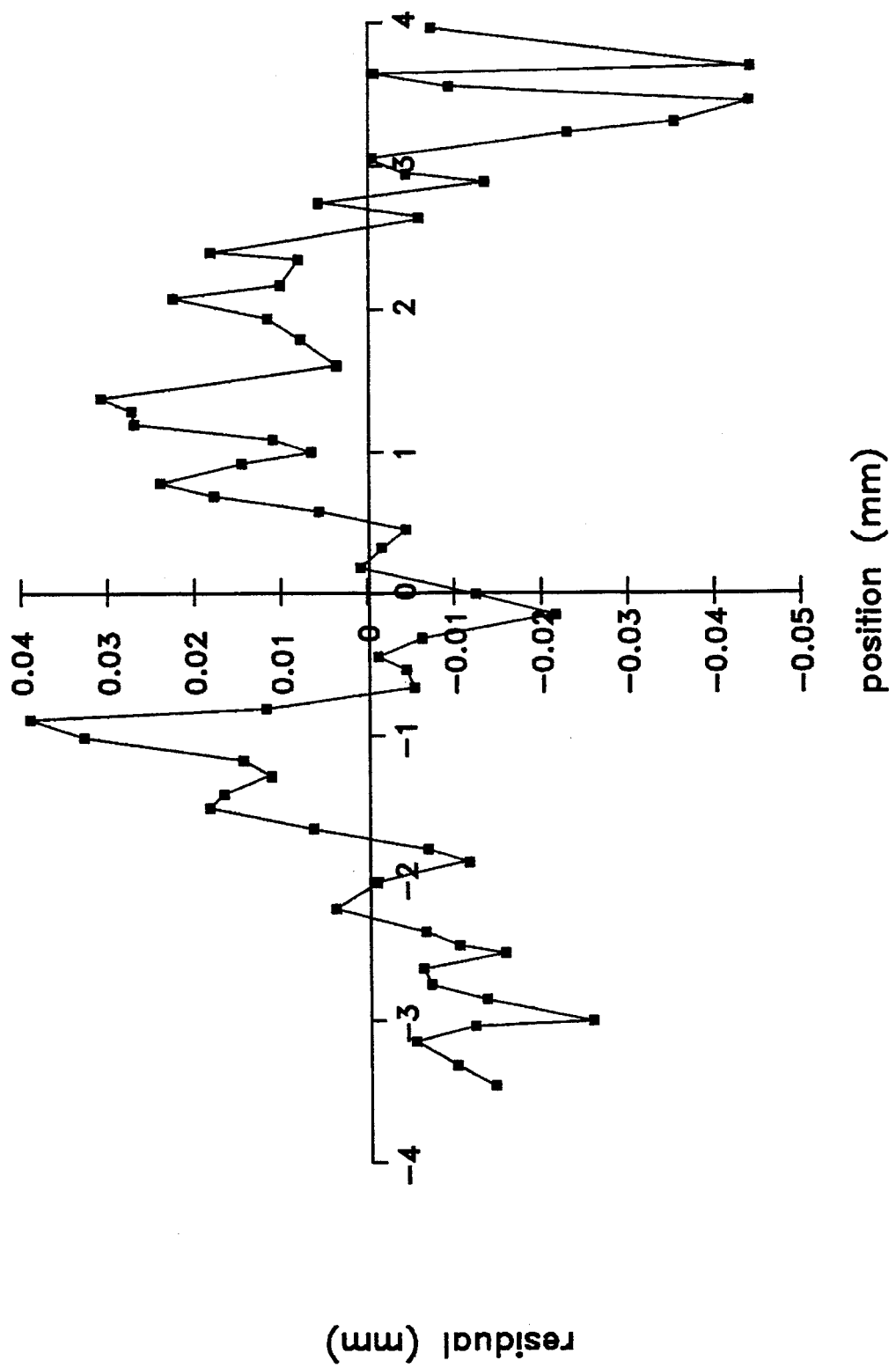

FIG. 11 illustrates the precision of a preferred embodiment of the present invention.

Figure 12:
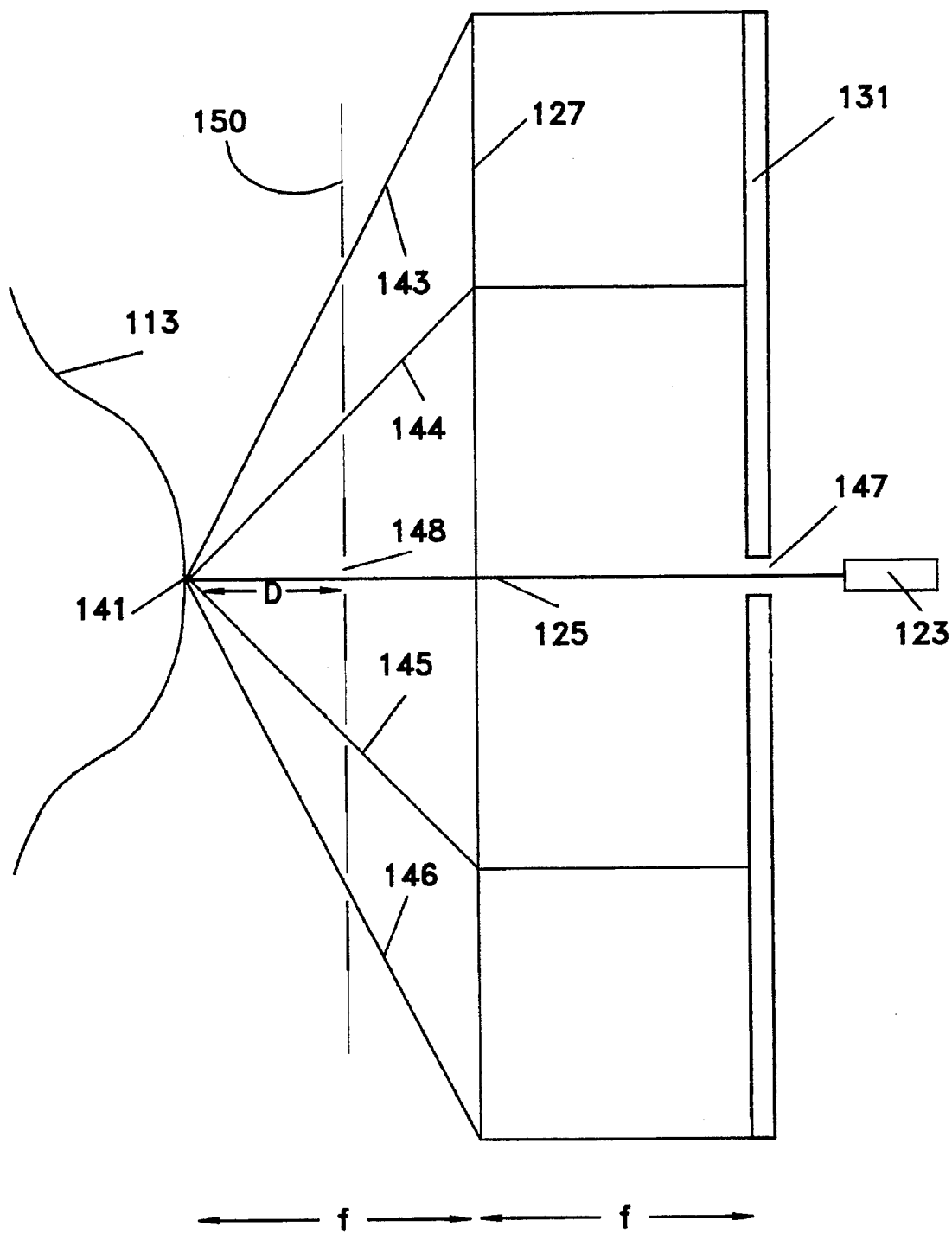

FIG. 12 illustrates the use of the invention to determine the distance "D" to a diffusely reflecting surface 113.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

DESCRIPTION OF THE PREFERRED EMBODIMENTS

Figure 4:
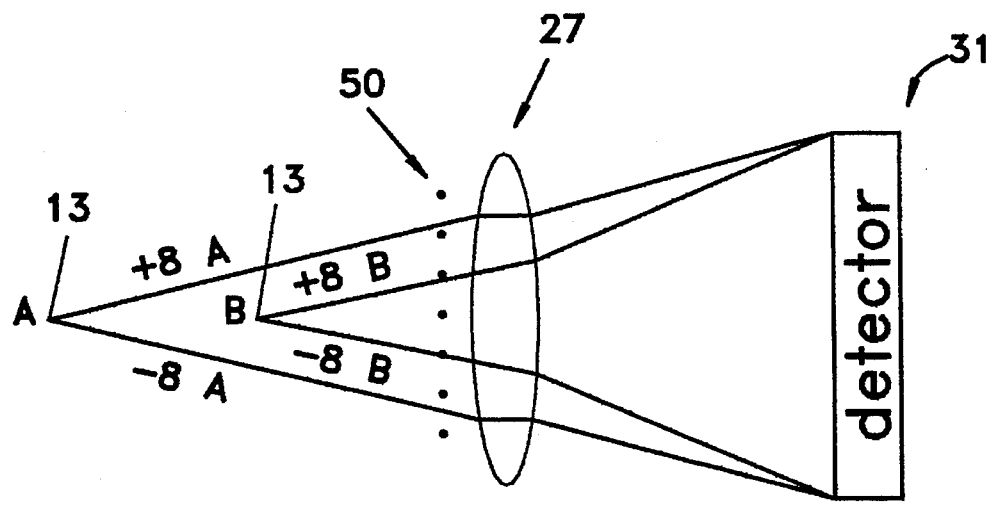
FIG. 4 is a schematic diagram of apparatus for practicing the present invention.

FIG. 4 shows the components of a fiber location monitoring system constructed in accordance with the present invention. Fiber 13 is shown at two locations marked A and B in FIG. 4. Light from the fiber passes through spatial modulating means 50, lens system 27, and is detected by detector 31. Detector 31 can be of the type described in the above-referenced U.S. Pat. No. 5,309,221.

Spatial modulating means 50 has a spatial frequency $\omega_M$ and spatially modulates the light passing through it at that spatial frequency. The spatial modulating means can be a mask or similar device having a periodic variation in transmission, phase, or other optical property.

A preferred form of spatial modulating means 50 is a Ronchi ruling. The following discussion is thus in terms of such a ruling, it being understood that other spatial modulating means can be used if desired.

As known in the art, a Ronchi ruling consists of alternating opaque and transparent slits, which can be formed, for example, by placing chrome strips on a glass plate. All of the opaque slits have the same width and all of the transparent slits have the same width, but the widths of the opaque and transparent slits do not have to be the same. Accordingly, in addition to its spatial frequency $\omega_M$ (given by one over the spacing between, for example, transparent slits), a Ronchi ruling is also characterized by its duty cycle, i.e., the ratio of the width of an opaque slit to the sum of the width of an opaque slit and the width of a transparent slit.

A preferred duty cycle for a Ronchi ruling for use in the practice of the present invention is about 0.15, i.e., about 15% of the area of the Ronchi ruling is opaque. This duty cycle is preferred because it provides a relatively high level of illumination at detector 31, i.e., it avoids light starvation problems at the detector. Other duty cycles can, of course, be used in the practice of the invention if desired.

Figure 1:
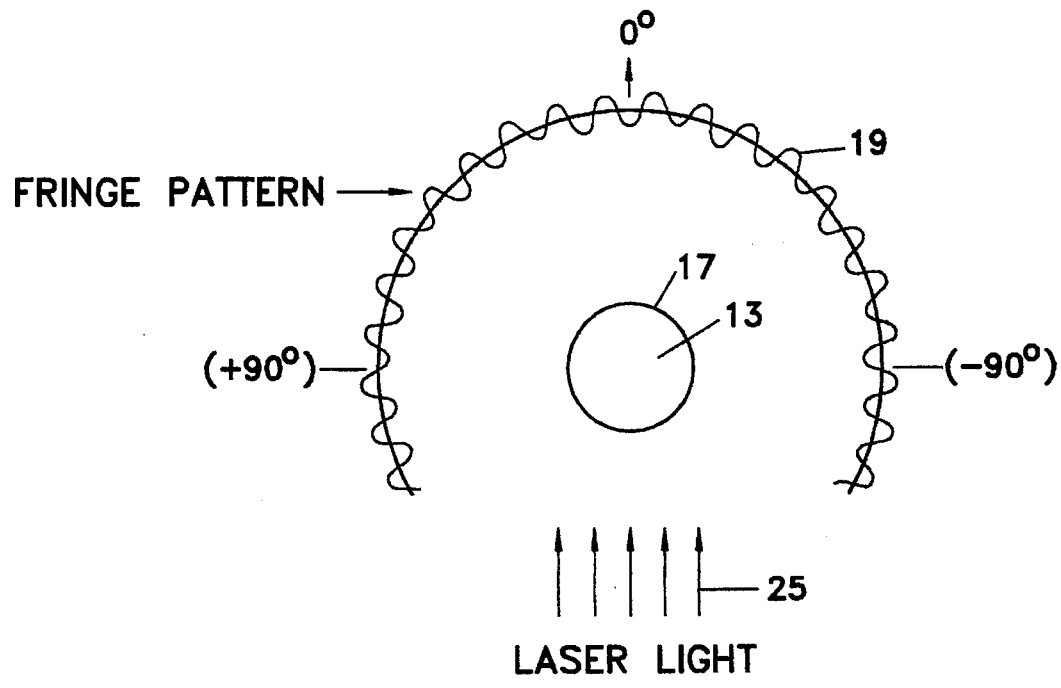
FIG. 1 is a schematic gram illustrating the basic elements of a Watkins-type system for measuring fiber diameters using far-field interference patterns.
Figure 2:
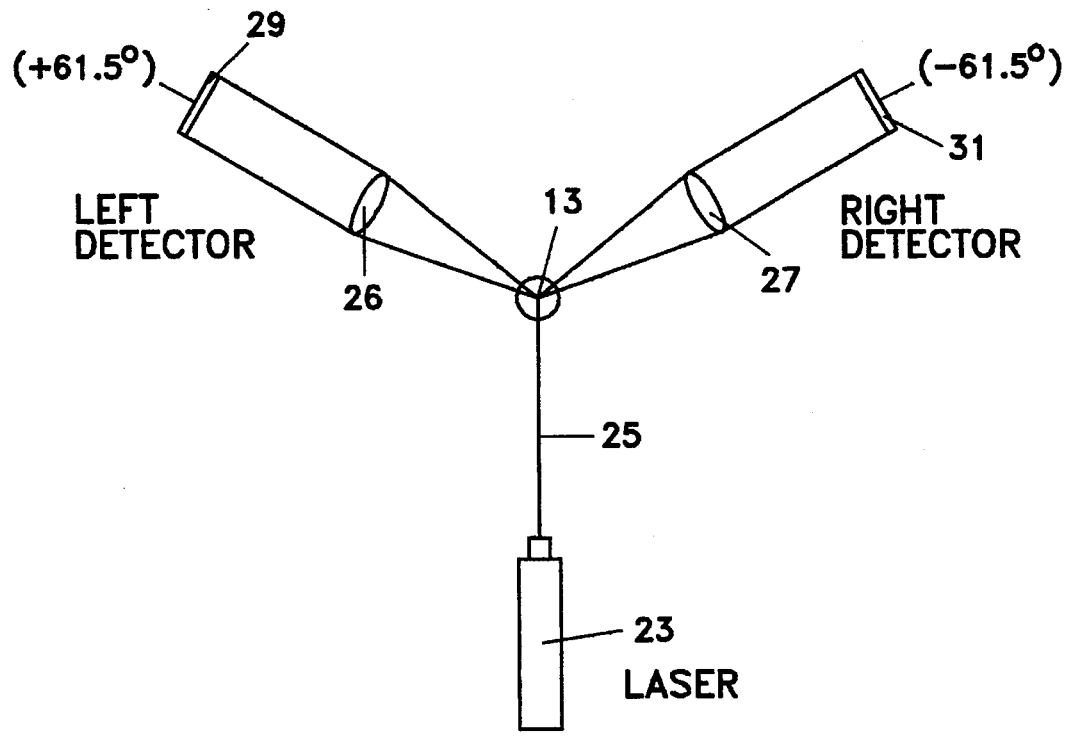
FIG. 2 is a schematic diagram illustrating the components of a fiber monitoring and control system with which the present invention can be used.
Figure 3:
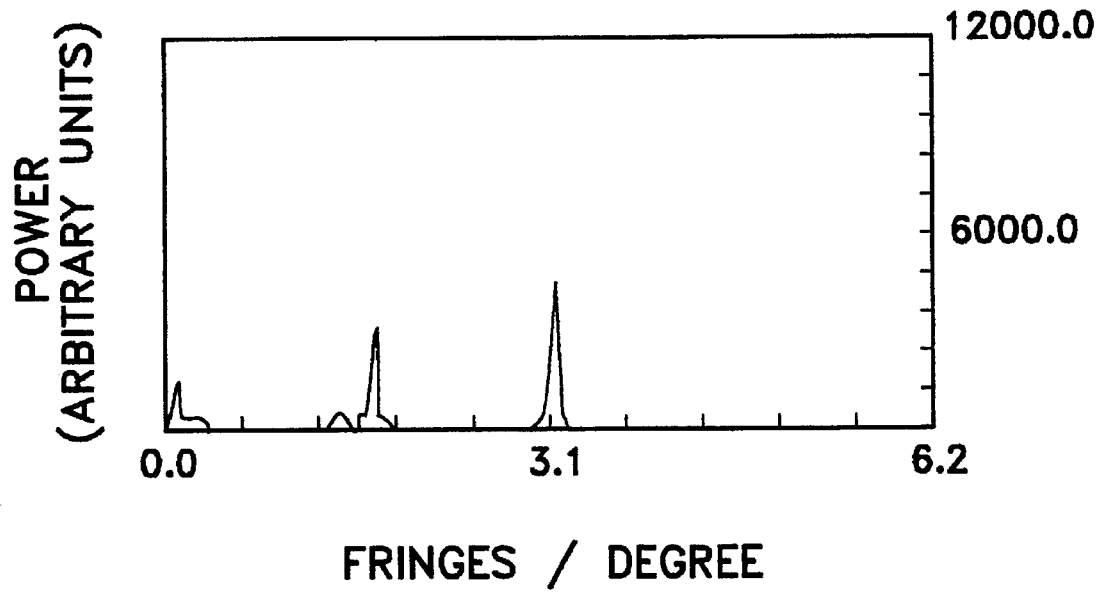
FIG. 3 shows a frequency spectrum of a calculated far-field interference pattern of a 125 micron, coreless fiber containing a 5 micron on-center hole.

Ronchi rulings can be readily added to a diameter-defect-coating monitor of the type shown in FIG. 2 by simply mounting a ruling on the fiber side of each of lens systems 26 and 29. Ronchi rulings are commercially available at reasonable cost.

Lens system 27 is an optional component of the system which, as explained below, linearizes the output of the distance monitoring system. Lens systems of the type discussed in the above-referenced U.S. Pat. No. 5,309,221 can be used in the practice of the present invention.

Lens system 27 has a positive optical power, is preferably located between the Ronchi ruling and the detector, and is spaced from the detector by the lens system's focal length "f". That is, the detector is in the lens systems' focal plane, in particular, in its back focal plane. The focal plane of a lens system has the important property that parallel rays in object space intersect the focal plane at a common radial distance from the system's optical axis.

Figure 5:
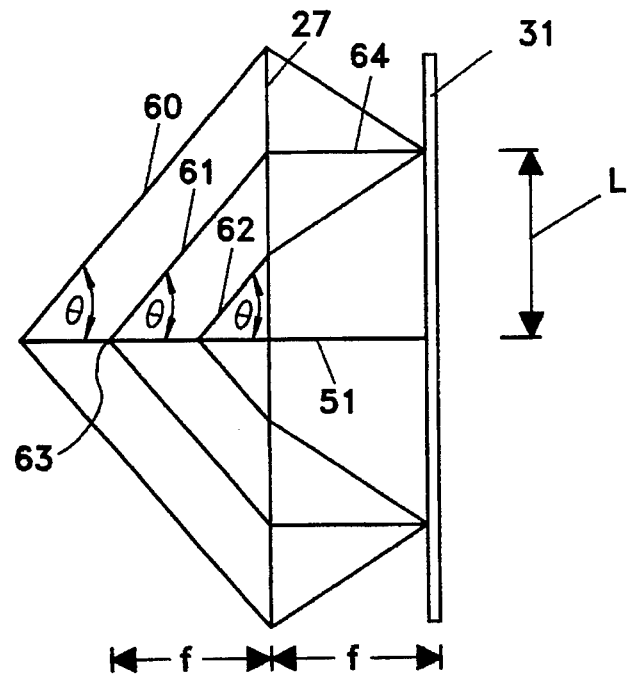
FIG. 5 is a schematic diagram illustrating the effects of locating a detector 31 in the back focal plane of a lens system 27.

This property is illustrated schematically in FIG. 5, where 51 is the system's optical axis and "L" is the radial distance from the optical axis. For a linear detector 31, "L" is simply the distance from the center of the detector, assuming the detector is centered on the optical axis. As shown in this figure, parallel rays 60, 61, and 62 are all refracted by lens system 27 so that they hit detector 31 at the distance "L".

Ray 61 originates at the lens system's front focal point 63. Accordingly, after refraction by the lens system, this ray travels parallel to the optical axis as shown at 64 in FIG. 5. Using this ray, the distance "L" at the detector corresponding to all rays which intersect the optical axis at the angle θ can be readily determined. Specifically, as can be seen in FIG. 5, "L" is give by:

$$L = f \cdot \tan \theta, \quad (1)$$

where, as indicated above, "f" is the focal length of the lens system.

Equation 1 and FIG. 5 can be interpreted as showing that a detector of a given length in the back focal plane of a positive lens system will see the same angular spread of light coming from a fiber, irrespective of the distance of the fiber from the detector. This effect is illustrated schematically in FIG. 4 for a detector whose length corresponds to an angular spread of 16° about the optical axis of the lens system. As shown in this figure, detector 31 sees light in the ±8° range irrespective of whether fiber 13 is at position A or at position B.

Figure 6:
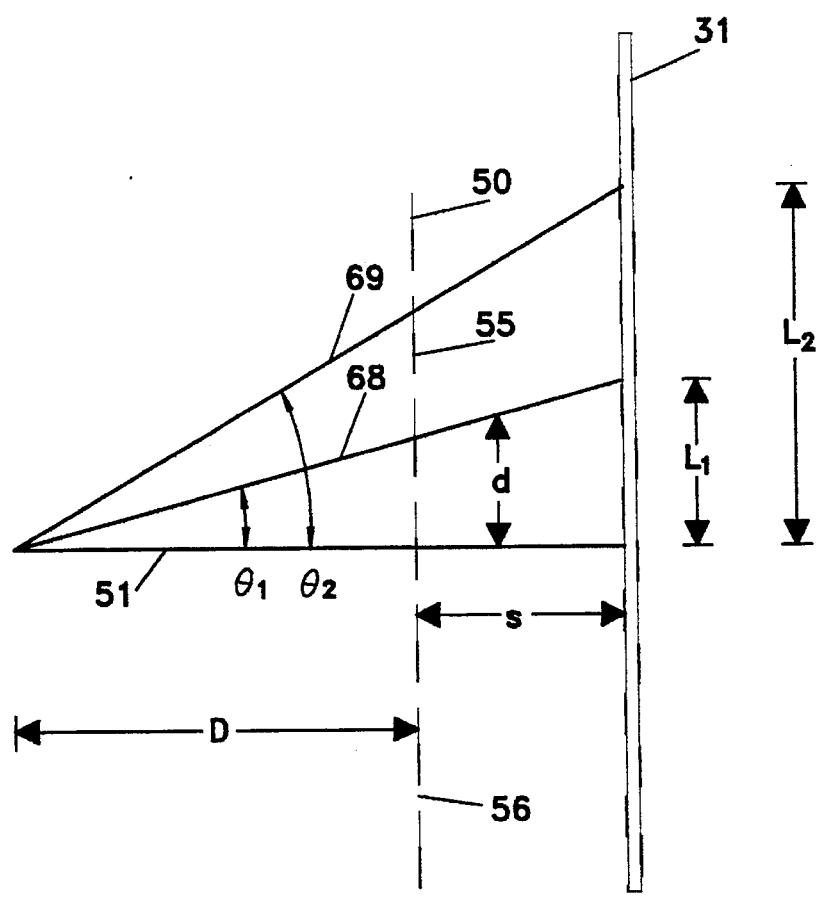
FIG. 6 is a schematic diagram illustrating the geometric relationships used in determining the relationship between $\omega_M$ at Ronchi ruling 50 and $\omega_D$ at detector 31.

The operation of the distance measuring system of the invention is shown schematically in FIG. 6, where 50 is a Ronchi ruling having opaque slits 55 and transparent slits 56 oriented perpendicular to the plane of the figure. The transparent slits 56 are separated from one another by the distance "d" which is equal to $1/\omega_M$. The Ronchi ruling is separated from detector 31 by the distance "S".

Consider a fiber located at a distance "D" from the Ronchi ruling. Rays 68 and 69 from this fiber will hit detector 31 at heights $L_1$ and $L_2$, respectively, defined by the relationships:

$$\tan \theta_1 = L_1/(D+S)$$

$$\tan \theta_2 = L_2/(D+S).$$

The tangents of $\theta_1$ and $\theta_2$ must also satisfy the following relationships:

$$\tan \theta_1 = d/D$$

$$\tan \theta_2 = 2d/D. \quad (2)$$

The following relationships then follow:

$$L_1/(D+S) = d/D$$

$$L_2/(D+S) = 2d/D.$$

These relationships, in turn, lead to the following expression for the ray through the nth transparent slit:

$$L_n/(D+S)=nd/D.$$

The distance between the (n+1)th and the nth illuminated area on detector 31 is then:

$$L_{n+1}-L_n=d(D+S)/D$$

which in terms of $\omega_D$ and $\omega_M$ becomes:

$$1/\omega_D=(D+S)/(\omega_M \cdot D).$$

Solving for D gives:

$$D=S\cdot\omega_D/(\omega_M-\omega_D) \qquad (3)$$

thus showing that D is a function of $\omega_D$ and thus can be monitored (measured) by determining $\omega_D$ for light from the fiber which reaches detector 31 after having been spatially modulated by Ronchi ruling 50.

Significantly, this measurement of D is not dependent, at least to first order, upon the transverse location of the fiber. Among other ways, this can be seen by imagining that ruling 50 is moved upward in FIG. 6 by a distance "d". Plainly, rays 68 and 69 will still strike detector 31 at $L_1$ and $L_2$, respectively, and the above analysis will be unchanged. Of course, if the fiber is moved sufficiently far off-axis, system performance will begin to degrade as the number of illuminated areas on detector 31 decreases. Eventually, the system will stop functioning as the fiber moves completely out of the system's field of view.

In equation (3), the dependence of D upon $\omega_D$ is not linear. The inclusion of a lens system between the Ronchi ruling and the detector, with the detector being in the rear focal plane of the system, provides such linearity as follows.

From relationships (2) above, $\theta_n$ for the nth transparent slit is given by:

$$\tan \theta_n = nd/D.$$

From equation (1) above, $\theta_n$ also satisfies the following relationship:

$$\tan \theta_n = L_n/f.$$

Accordingly, $L_n$ can be written:

$$L_n=nfd/D$$

so that $L_{n+1}-L_n$ is given by:

$$L_{n+1}-L_n=fd/D$$

which in terms of $\omega_D$ and $\omega_M$ gives the following for D:

$$D=f\cdot\omega_D/\omega_M. \qquad (4)$$

That is, when a lens system is placed a distance "f" ahead of the detector, and the Ronchi ruling is placed in front of the lens system, the distance of the fiber from the Ronchi ruling becomes a linear function of $\omega_D$. Note that the Ronchi ruling can be placed behind the lens system and the system will still work, but the relationship between D and $\omega_D$ will no longer in general be linear. Accordingly, placing the Ronchi ruling in front of the lens system is preferred. It should also be noted that since equation (1) is only precisely true for paraxial rays, equation (4) is also only precisely true for such rays.

FIG. 7 shows a spatial spectrum for a system of the type shown in FIG. 4 for a fiber having a diameter of about 125 microns, a Ronchi ruling having an $\omega_M$ value of about 4.0 cycles/mm, and a Ronchi ruling-to-fiber distance "D" which is approximately equal to the focal length "f" of lens system 27. As can be seen in this figure, the spectrum includes an O.D. component whose spatial frequency $\omega_{OD}$ is about 3.1 cycles/degree and a position component whose spatial frequency $\omega_D$ is about 4.3 cycles/degree.

The spectrum also contains two other components labelled 70 and 71 in FIG. 7. These components are the result of heterodyning between the position component and the O.D. component, and appear at spatial frequencies corresponding to the sum and difference of the spatial frequencies of the position and O.D. components, i.e., at about 7.4 cycles/degree (4.3+3.1) and about 1.2 cycles/degree (4.3−3.1) in FIG. 7.

The existence of these heterodyne components raises the possibilities of diameter mismeasurements and false hole detections through the mistaken identification of a heterodyne component as an O.D. component or a defect component. In accordance with the preferred embodiments of the invention, it has been found that these problems can be avoided by choosing $\omega_M$ so that $\omega_{OD}$ is substantially less than (i) $\omega_D$ and (ii) $\omega_D-\omega_{OD}$ for the expected locations and diameters of the fiber.

For example, a Ronchi ruling having a spatial frequency of 12.3 cycles/mm is preferred for expected Ronchi ruling-to-fiber distances which are approximately equal to the focal length of lens system 27 and for fibers having expected diameters of less than about 200 microns. As shown in FIG. 8, the heterodynes for such a ruling and, in particular, the lower frequency heterodyne, are well above the O.D. component.

In selecting such a higher $\omega_M$ value it should be noted that the position component can disappear (drop out) at certain positions of the fiber. Although not wishing to be bound by any particular theory of operation, it is believed that such dropouts arise from diffractive effects as the widths of the transparent and opaque slits of the Ronchi ruling are decreased as the spatial frequency increases. It is also believed that the use of a low duty cycle aggravates this problem.

The preferred $\omega_M$ value of 12.3 cycles/mm discussed above has been found to have a dropout position which does not interfere with the monitoring of the position of a fiber during drawing. Values of $\omega_M$ other than 12.3 cycles/mm can, of course, be used in the practice of the invention. The particular value of $\omega_M$ to be used for any specific distance monitoring system can be readily determined by persons skilled in the art from the disclosure herein.

The spatial frequency spectra of FIGS. 7 and 8 can be computed using discrete sequence Fourier transforms as disclosed in the above-referenced U.S. Pat. No. 5,309,221, and that approach is preferred when high precision is required. An alternate approach which provides somewhat lower precision, but takes less compute time, is shown in FIG. 9. The procedure will be discussed in terms of a detector which has 2048 pixels, it being understood that the procedure can be readily adapted by persons skilled in the art to detectors having a different number of pixels.

The first step in the procedure is to select the center 1024 pixels out of the 2048 pixels of raw data in order to reduce the calculation time while still providing sufficient resolution. Next, as shown in block 201 of FIG. 9, each of the data values for the 1024 center pixels is multiplied by a complex modulation of the form:

$$\exp(-i\cdot n\cdot x\cdot 2\cdot\pi/2048)$$

where i is the square root of −1, n is the number of the pixel, and x is the desired modulation value selected so that the shifted spatial frequency of the position peak is close to but greater than zero. For example, if the minimum $\omega_D$ is expected to be above 12.0 cycles/degree, a preferred value for x for a 16° detector is 192 which will shift 12 cycles/degree to zero. In general, it is preferred to use a value of x which is divisible by 4.

As shown in block 202, the next step in the procedure is to filter the modulated data values with a 26 tap low pass FIR filter. The filter is applied to remove any aliases generated in decimation step 203. The filter has a notch at the frequency of the DC component as shifted by modulation step 201. Preferred coefficients for the filter are set forth in Table 1. With these coefficients, the average attenuation of the filter is −30 dB.

As shown in block 203, the next step is to decimate the 1024 pixels by 16 to 1. This step is done to reduce the calculation time of the complex fast Fourier transform (FFT) while still retaining sufficient resolution. The 1024 pixels are reduced to 64 pseudopixels by this step.

The pseudopixels are then windowed in step 204 to reduce signal leakage and ringing, and thus allow the spatial frequency of the position peak to be determined with sufficient resolution. The pseudopixels are preferably windowed with a Blackman-Harris window of the form:

$$0.35875 - 0.48829 \cdot \cos(2 \cdot \pi \cdot n/63) + 0.14128 \cdot \cos(4 \cdot \pi \cdot n/63) - 0.01168 \cdot \cos(6 \cdot \pi \cdot n/63)$$

where n is the pseudopixel index ranging from 0 to 63.

As shown in block 205, the next step is to perform a 64 point complex FFT to transform the pseudopixel values into spatial frequency values. The complex FFT can be performed using the Cooley, Lewis, and Welch technique as described in their paper entitled "The Fast Fourier Transform and its Applications," IBM Research Paper RC 1743, Feb. 9, 1967. See also Rabiner and Gold, *Theory and Application of Digital Signal Processing,* Prentice-Hall, New York, 1975, page 367; and Cooley et al., *IEEE Transactions in Education,* March 1969, pages 27–34. Other techniques can be used if desired. In order to save time, the frequency coefficients generated by the complex FFT are left in magnitude squared form.

A complex FFT is used because it produces 64 frequency coefficients out of 64 pseudopixels. Also, the heterodyne peaks will wrap around from 0 to 63 instead of reflecting off of zero frequency. The value of such wrapping around can be seen as follows.

Because of the presence of the diameter component, the position component has two heterodynes which for a 125 micron fiber are spaced on either side of the position component by about 3.1 cycles/degree (see above). If the position component is shifted from about 13.7 cycles/degree to about 1.7 cycles/degree after steps 202 through 204 have been performed, then the heterodynes will fall at about −1.4 cycles/degree and about 4.8 cycles/degree.

For a complex FFT, the lower heterodyne is wrapped around to about 6.6 cycles/degree. If a FFT were used, the lower heterodyne would be reflected to about 1.4 cycles/degree and would thus interfere with the position peak at about 1.7 cycles/degree.

As shown in block 206, the final step in the procedure is the determination of the value of $\omega_D$. For a non-hermetically-coated fiber, outside of the dropout regions discussed above, the position peak is the largest peak. Accordingly, the position peak location is determined by first finding the largest frequency space peak. A parabolic fit is then performed on the magnitude of this largest peak and the magnitudes of the peaks on either side of the largest peak. The location of the position peak is then the spatial frequency at which this parabolic curve has its maximum value.

For a hermetically-coated fiber and polarized illumination, one of the heterodynes can be larger than the position peak for certain fiber positions. The position peak is therefore found by limiting the region of search for the largest peak to exclude the heterodynes, e.g., for the numerical values discussed above, the search for the largest peak would be limited to below about 2.3 cycles/degree.

FIGS. 10 and 11 show the results of applying the procedure of FIG. 9 to the problem of determining the position of an optical waveguide fiber. The data shown in these figures was obtained using the apparatus of FIG. 4. The Ronchi ruling employed had a $\omega_M$ value of 12.3 cycles/mm and a duty cycle of 15%. No drift was observed for the system over an extended period of use.

The vertical axis in FIG. 10 sets forth the $\omega_D$ values at detector 31 determined using the procedure of FIG. 9 and the horizontal axis sets forth the actual position of the fiber as measured using a test fixture which allowed a segment of fiber to be positioned to within a few microns. The vertical axis in FIG. 11 shows the differences (residuals) between the actual positions and the $\omega_D$ positions and the horizontal axis again shows the actual positions. (Note that the system will normally be calibrated using a curve like that of FIG. 10.)

The linearity of the $\omega_D$ approach is clearly evident from FIGS. 10 and 11. As the fiber moves closer to the detector, i.e., towards the right in FIG. 10, the value of $\omega_D$ decreases linearly. As shown in FIG. 11, the pointwise error over ±150 mils (±3.8 mm) is less than 50 microns. A measure of the resolution of the system was made using three data points to determine a local slope, and that local slope was used as an estimate of the resolution. The resolution was found to vary somewhat over the ±150 mils (±3.8 mm) range, but at no point was it estimated to be worse than 10 microns. These error and resolution values are more than sufficient to monitor and control the position of a fiber during drawing and to determine and control the tension in the fiber from the monitored position. If desired, as indicated above, even greater precision can be achieved through the use of the analysis techniques of the above-referenced U.S. Pat. No. 5,309,221.

The foregoing procedures for monitoring the position of a fiber are preferably combined with the fiber diameter measurement, defect detection, and hermetic coating monitoring procedures of the above-referenced EPO Patent Publication No. 608,538 and U.S. Pat. Nos. 5,185,636 and 5,309,221. The procedures are also preferably combined with the techniques for measuring the diameters of non-circular fibers set forth in U.S. Pat. No. 5,283,628. As shown in FIG. 2, two detectors are preferably used in these techniques, thus giving two measurements for the position of the fiber when the methods and apparatus of the present invention are employed with each detector. Using these two measurements, the exact position of the fiber in the plane defined by laser beam 25 can be readily determined by using the known positions of the Ronchi rulings which would be placed before lens systems 26,27 in such an overall control system and/or by calibration.

A more general application of the methods and apparatus of the present invention is illustrated in FIG. 12. This figure shows a system for determining the distance "D" from a Ronchi ruling 150 to a point 141 on a scattering, e.g., diffusely reflecting, surface 113. The system includes a lens system 127 and a detector 131 located in the back focal plane of the lens system. As discussed above, the lens system is optional and may be omitted if desired. Also, point 141 on surface 113 is shown located in the front focal plane of the lens system for ease in drawing light rays 143 through 146. The point on the surface whose distance is to be determined of course does not need to be at this position.

Light source 123 produces light beam 125 which passes through aperture 147 in detector 131, lens system 127, and transparent slit 148 of Ronchi ruling 150. If desired, the light source may be located above or below detector 131, in which case the detector does not need to include an aperture. The light source need not produce a coherent monochromatic beam of light, although such a beam can be used if desired, e.g., a laser can be used as the light source. Rather, a light source of any type can be used provided it produces a small spot of light at surface 113 so that the shadows of Ronchi ruling 150 have a sufficient contrast at detector 131.

The system of FIG. 12 operates in accordance with the principles set forth above and thus the distance "D" is given by equation (4). The system has a number of advantages in comparison to existing systems for determining the distance to a surface with high precision. In particular, the system has a number of advantages over laser triangulation systems which have been used in the past to make such measurements.

These advantages include: (1) intrinsic insensitivity to surface characteristics such as color or texture so long as the surface is somewhat specular; (2) intrinsic insensitivity to ambient light provided the modulation introduced by the Ronchi ruling is not completely washed out by the ambient light at the detector; (3) intrinsic stability in that the determination of position does not depend upon an analog measurement; and (4) lower included angle between the incident beam and the detected light.

Laser triangularization systems can be designed to provide features (1) through (3), but such systems do not have these features intrinsically and thus to provide the features, the cost and complexity of the system must in general be increased. Feature (4) cannot be incorporated in laser triangularization systems since such systems require a substantial included angle between the beam which strikes the surface and the detector, e.g., an angle of at least about 15°. Indeed, the sensitivity of a laser triangularization system increases as the included angle increases.

This need for a substantial included angle is a serious drawback of laser triangularization systems, especially when tracing a sharply concave surface such as a hole. The present invention is free of this deficit since the included angle between the beam and the detector can be as small as ±4° or even less.

The process of the invention as described above is preferably practiced on a digital computer system configured by suitable programming to perform the various computation and identification steps. The programming can be done in various programming languages known in the art. A preferred programming language is the C language which is particularly well-suited to performing scientific calculations. Other languages which can be used include FORTRAN, BASIC, PASCAL, C++, and the like.

The computer system can comprise a general purpose scientific computer and its associated peripherals, such as the computers and peripherals currently being manufactured by Digital Equipment Corporation, IBM, Hewlett-Packard, or the like. Alternatively, a dedicated system can be used in the practice of the invention, such as a system using multiple digital signal processing chips.

Preferably, the processing portion of the computer system should have the following characteristics: a processing rate of 50 million floating point operations per second, a word length of 32 bits floating point, at least four megabytes of memory, and at least 40 megabytes of disk storage. The system should include means for inputting data from the photodetector array and means for outputting the results of the position determination both in electronic form for use in process control and in visual form for observation by system operators, maintenance personnel, and the like. The output can also be stored on a disk drive, tape drive, or the like for further analysis and/or subsequent display.

Although preferred and other embodiments of the invention have been described herein, further embodiments may be perceived by those skilled in the art without departing from the scope of the invention as defined by the following claims.

TABLE 1

Coefficients for 26 Tap FIR Filter

| |
|---|
| H(1) = H(26) = 0.01421 |
| H(2) = H(25) = 0.008238 |
| H(3) = H(24) = 0.01194 |
| H(4) = H(23) = 0.01714 |
| H(5) = H(22) = 0.02362 |
| H(6) = H(21) = 0.03097 |
| H(7) = H(20) = 0.03865 |
| H(8) = H(19) = 0.04614 |
| H(9) = H(18) = 0.05295 |
| H(10) = H(17) = 0.05874 |
| H(11) = H(16) = 0.06324 |
| H(12) = H(15) = 0.06631 |
| H(13) = H(14) = 0.06786 |

What is claimed is:

1. A method for monitoring the location of a filament comprising the steps of:
   (a) directing a beam of radiation at the filament so that a portion of the filament comprises a scattering light source;
   (b) spatially modulating light from said scattering light source, said spatial modulation having a spatial frequency $\omega_M$;
   (c) detecting said spatially modulated light; and
   (d) determining a spatial frequency $\omega_D$ for the detected spatially modulated light, said spatial frequency being indicative of the location of the filament.

2. The method of claim 1 wherein step (d) is performed by:
   generating a spatial frequency spectrum for said detected spatially modulated light; and
   identifying a component of said spatial frequency spectrum having said spatial frequency $\omega_D$ which is indicative of the location of the filament.

3. The method of claim 1 wherein a Ronchi ruling is used to perform step (b).

4. The method of claim 1 wherein between steps (b) and (c), said spatially modulated light is transformed by a lens system so that the location of the filament is a linear function of $\omega_D$.

5. The method of claim 2 wherein the filament is transparent and the beam of radiation produces an interference pattern which is detected in step (c).

6. The method of claim 5 wherein the spatial frequency spectrum includes an outside diameter component which is used to monitor the diameter of the filament.

7. The method of claim 6 wherein the outside diameter component has a spatial frequency $\omega_{OD}$ and wherein $\omega_M$ is chosen so that $\omega_{OD}$ is substantially less than (i) $\omega_D$ and (ii) $\omega_D - \omega_{OD}$ for the expected locations and diameters of the filament.

8. The method of claim 5 wherein the spatial frequency spectrum is used to detect defects in the filament.

9. The method of claim 5 wherein the spatial frequency spectrum is used to monitor the thickness of a hermetic coating on the filament.

10. The method of claim 1 wherein steps (b) through (d) are performed at each of two spatially separated locations.

11. The method of claim 10 wherein the beam of radiation defines an axis and the two spatially separated locations are each angularly displaced from the axis.

12. A method for controlling the location of a filament comprising the steps of:

(a) directing a beam of radiation at the filament so that a portion of the filament comprises a scattering light source;

(b) spatially modulating light from said scattering light source, said spatial modulation having a spatial frequency $\omega_M$;

(c) detecting said spatially modulated light;

(d) determining a spatial frequency $\omega_D$ for the detected spatially modulated light, said spatial frequency being indicative of the location of the filament; and (e) generating a control signal for the location of the filament from the value of $\omega_D$.

13. The method of claim 12 wherein step (d) is performed by:

generating a spatial frequency spectrum for said detected spatially modulated light; and identifying a component of said spatial frequency spectrum having said spatial frequency $\omega_D$ which is indicative of the location of the filament.

14. The method of claim 12 wherein a Ronchi ruling is used to perform step (b).

15. The method of claim 12 wherein between steps (b) and (c), said spatially modulated light is transformed by a lens system so that the location of the filament is a linear function of $\omega_D$.

16. The method of claim 13 wherein the filament is transparent and the beam of radiation produces an interference pattern which is detected in step (c).

17. The method of claim 16 wherein the spatial frequency spectrum includes an outside diameter component which is used to control the diameter of the filament.

18. The method of claim 17 wherein the outside diameter component has a spatial frequency $\omega_{OD}$ and wherein $\omega_M$ is chosen so that $\omega_{OD}$ is substantially less than (i) $\omega_D$ and (ii) $\omega_D-\omega_{OD}$ for the expected locations and diameters of the filament.

19. The method of claim 16 wherein the spatial frequency spectrum is used to detect defects in the filament.

20. The method of claim 16 wherein the spatial frequency spectrum is used to control the thickness of a hermetic coating on the filament.

21. The method of claim 12 wherein steps (b) through (e) are performed at each of two spatially separated locations.

22. The method of claim 21 wherein the beam of radiation defines an axis and the two spatially separated locations are each angularly displaced from the axis.

23. Apparatus for measuring the distance to a surface comprising:

detecting means for detecting light at a plurality of spatially distributed locations;

illuminating means for directing a beam of light at the surface so that at least a portion of the beam is scattered from the surface onto the detecting means (the scattered light);

spatial modulating means between the surface and the detecting means for spatially modulating the scattered light, said spatial modulation of the scattered light having a spatial frequency $\omega_M$;

means for determining a spatial frequency $\omega_D$ of the spatially modulated scattered light at the detecting means, the distance between the spatial modulating means and the surface being a function of $\omega_D$.

24. The apparatus of claim 23 wherein the spatial modulating means is a Ronchi ruling.

25. The apparatus of claim 23 further comprising a lens system between the spatial modulating means and the detecting means, said lens system having a positive power and the detecting means being in the lens system's back focal plane, whereby the distance D between the spatial modulating means and the surface is a linear function of $\omega_D$.

* * * * *